United States Patent
Verma

(10) Patent No.: US 6,215,772 B1
(45) Date of Patent: Apr. 10, 2001

(54) DYNAMIC PARAMETER ESTIMATION FOR EFFICIENT TRANSPORT OF HPR DATA ON IP

(75) Inventor: Dinesh Chandra Verma, Millwood, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/980,073

(22) Filed: Nov. 26, 1997

(51) Int. Cl.$^7$ .......................... H04L 12/28; H04L 12/56; G06F 15/173; G06F 15/16
(52) U.S. Cl. .......................... 370/236; 370/231; 370/410; 709/224; 709/233
(58) Field of Search .......................... 370/829, 230, 370/231, 229, 235, 236, 409, 410, 519; 709/233, 224; 375/356

(56) References Cited

U.S. PATENT DOCUMENTS

| | | | |
|---|---|---|---|
| 5,450,394 | * 9/1995 | Gruber et al. | 370/253 |
| 5,457,681 | * 10/1995 | Gaddis et al. | 370/402 |
| 5,515,359 | * 5/1996 | Zheng | 370/231 |

* cited by examiner

Primary Examiner—Huy D. Vu
Assistant Examiner—Kevin C. Harper
(74) Attorney, Agent, or Firm—Louis P. Herzberg

(57) ABSTRACT

The invention describes a scheme by which the dynamic characteristics of virtual links provided to a first network protocol engine are fed back to a second network protocol engine, and used to improve the performance of the second protocol traffic across a backbone. As an example, the invention describes a scheme by which the dynamic characteristics of the virtual links provided to the HPR network are fed back to the RTP protocol, and used to improve the performance of RTP traffic across the IP backbone. The invention provides this feedback using the mechanisms provided by the HPR networking architecture, and thus can inter-operate with HPR networks that do not support this invention. In one embodiment of the present invention, on the link characteristics are determined by programs running on both end of the IP network. These link characteristics are sent to the HPR end-node when an HPR connection is established. The HPR end-node obtains the information during the connection establishment phase. During the initiation of a connection, the HPR connection establishment protocols send out route-setup messages along the desired path of the connection. When the message is received by the node along the path, it is required to send its fixed bandwidth and delay in the route-setup control vector, a component of the set-up message. This value is dynamically changed so as to reflect the current state of the network. Three methods to obtain the current link characteristics of the multi-hop IP network are described.

12 Claims, 9 Drawing Sheets

Structure of an IP packet

Structure of an HPR packet

Structure of an HPR packet on an IP network

DYNAMIC PARAMETER ESTIMATION FOR EFFICIENT TRANSPORT OF HPR DATA ON IP

FIELD OF THE INVENTION

This invention is directed to the field of computer communication networks. It is more particularly directed to inter-operation among different types of communication networks.

BACKGROUND OF THE INVENTION

The computer communication network in a typical enterprise has changed substantially over the last two decades. Until the middle 80's most enterprise networks were based on IBM's SNA architecture. Such networks connected database servers, usually IBM mainframes, to several client terminals. However, since the late 80's, the use of IP in the enterprise network has become more prevalent. However, the applications in the client and the mainframe are largely the original SNA-based ones. In such an environment, one needs to transport SNA application data over an IP network efficiently. The typical communication occurs between two SNA networks, which are connected by an intermediary IP network.

These computer communications networks in the enterprise interconnect these different terminals, work-stations, personal computers, servers and host and enable them to inter-operate. The inter-operation between these machines is obtained by using a common communication protocols and architecture. An architecture developed by IBM, called SNA (Systems Networking Architecture) is a very common networking architecture in an enterprise.

Over the years, SNA architecture has evolved into several versions. The initial version of SNA networks was relatively static, and machine communication had to be pre-configured. This version is commonly known as the subarea SNA. The next version of an SNA network provided dynamic configuration of communication among different machines, and is known as APPN (Advanced Peer to Peer Networking). A further enhancement to APPN is known as HPR (High Performance Routing). HPR augments APPN by providing two functional enhancements, a flexible routing mode called ANR (Automatic Network Routing) and a transport protocol called RTP. While subarea SNA required that each of the links in the network be reliable, HPR does not have such a requirement. ANR links may be unreliable, and RTP provides end-to-end reliability by retransmitting packets.

Another architecture, based on the Internet Protocol, or IP, is commonly used in an enterprise. IP provides a connectionless network on top of which two transport protocols are commonly supported, TCP, which provides a reliable byte-stream transport of data end-to-end, and UDP which provides an unreliable datagram service end-to-end. Due to historical reasons, many enterprises have evolved to have a structure in which clusters of SNA networks are inter-connected with an intervening IP network. Communication in these networks usually tend to be from a client SNA network which supports different terminals, to a SNA network containing a mainframe server. The client networks are connected to the server networks by an intermediate IP network. To the SNA network, the entire IP network appears to be a set of SNA links that connect the different sites together. SNA protocols operate transparently over these virtual links.

One way for transport of SNA traffic over IP network is using a protocol called DLSW (Data Link Switching). This protocol terminates the SNA connection at the boundary of the SNA and the IP networks. And splices the two resulting SNA connections by means of a TCP connection. The splicing imposes a significant load on the computer implementing DLSW due to the need to maintain the connection state and protocol for both SNA and TCP sides of the connection. The DLSW scheme consists of encapsulating an SNA packet into a TCP packet for carrying across the IP network. It is well-suited for sub-area SNA, but performs poorly when it is used for HPR networks. The congestion control used by RTP and TCP, the transport protocol used by DLSW, do not operate well together.

An alternative way is to encapsulate SNA data over the Internet UDP protocol. UDP is a unreliable connection-less protocol and the encapsulation process can be done very efficiently. However, SNA requires that the intermediate links provide reliable connectivity. This problem is addressed by replacing the core SNA protocol in the mainframe by the HPR (High Performance Routing) protocol, which has been developed as an adjunct to APPN (Advanced Peer to Peer Networking), an enhanced form of SNA protocol.

HPR provides reliability by using a reliable transport protocol called RTP. RTP operates over unreliable links, and uses a congestion control policy called ARB (adaptive rate-based control). The ARB protocol sends out packets at a regular spacing, increasing the spacing when it detects that the network is congested, and decreasing the spacing when it senses that the network is lightly loaded.

ARB was designed to operate on links which are used exclusively for HPR traffic. HPR assumes that each link on the network is a constant-delay fixed-bandwidth point-to-point link, on which all the traffic originates from competing HPR sources. The characteristics of all links are determined when the link is brought up, and distributed to all other nodes in the HPR network. When part of the network is carried on an IP backbone, the entire IP network is made to appear like a single SNA link to the HPR/ARB algorithm. This is done by encapsulating HPR packets into UDP packets and tunnelling them through the IP network.

ARB fails to perform adequately in IP-based networks. ARB assumes that it is operating over a link with a fixed delay and bandwidth. In reality, this virtual link consists of several links with competing traffic from other protocols such as TCP sharing the link bandwidth. The characteristics of the link change over time. The performance of ARB is adversely affected when the link characteristics it assumes differ substantially from the instant link characteristics.

While the creation of logical links is used in various networking infrastructures, the performance of logical links is generally poor. The key to good performance of HPR networks is the performance of its transport protocol RTP. RTP bases its operation on the behaviour of the intermediate links along the path of a pair of communicating hosts, and assumes that all the links in the network are used exclusively by RTP sources. In an HPR over IP environment, the logical links over the IP network carry a variety of non-RTP traffic which alters the characteristics of the logical link significantly. In this invention, we describe a solution which would cause RTP performance to improve when operating over an IP backbone A solution to the dynamic link configuration problem is to determine the right characteristics of the virtual link at different times and distributing them to the network. However, such a dynamic distribution can cause a significant overhead on the network. Furthermore, it will require changes to the HPR topology distribution protocol.

SUMMARY OF THE INVENTION

The current invention describes a scheme by which the dynamic characteristics of the virtual links provided to the HPR network are fed back to the RTP protocol, and used to improve the performance of RTP traffic across the IP backbone. The invention provides this feedback using the mechanisms provided by the HPR networking architecture, and thus can inter-operate with HPR networks that do not support this invention.

In the present invention the link characteristics are determined by programs running on both end of the IP network. These link characteristics are sent to the HPR end-node when an HPR connection is established. The HPR end-node obtains the information as appropriate fields in the Route-Setup Control Vector that is exchanged among different HPR nodes during the connection establishment phase.

During the initiation of a connection, the HPR connection establishment protocols send out route-setup messages hop by hop along the desired path of the connection. When the message is received by the node along the path, it is required to send its fixed bandwidth and delay in the route-setup control vector, a component of the set-up message. This value is dynamically changed so as to reflect the current state of the network.

There are many methods to obtain the current link characteristics of the multi-hop IP network. One method uses existing tools. There are existing tools that will identify the characteristics of an IP network. These tools impose a heavy load on the network for deciphering the path characteristics, but can be used at relatively long intervals to determine the path characteristics in a network. The commonly available such tools include and traceroute and pathchar.

A second method uses a packet pair scheme. In this case, one end of the IP network sends out two back-to-back packets to its partner the other end of the network. The partner records the difference in time between the two packets, and relays the information back to the network. The information is relayed back to the originating node, which uses the temporal separation between the two nodes to determine the bottleneck link speed in the multi-hop network. The step is repeated several time so as to obtain a dynamic moving average. The network delay is obtained by averaging over the round-trip delays observed by the sender.

A third method uses an aggressive congestion scheme. Here, one end of the IP network snoops into the RTP headers to determine whether a packet is being transmitted for the first time, is being re-transmitted, or an acknowledgment is being received for the packet. The snooper computes the network bandwidth and delay parameters for ARB which would cause it to become as aggressive as the TCP congestion control scheme for the connection. This protocol requires a pre-existing RTP connection. In HPR, each node establishes a RTP connection between entities known as control points. The control point connection is an ideal connection to monitor for this comparison.

Several of these schemes can be used together to obtain a good estimate of the current network characteristics. The estimation of dynamic link characteristics in this manner improves the performance of HPR ARB algorithm in a multiple-hop IP network, without requiring a change to existing APPN/HPR network protocols.

One aspect of the present invention provides a method for dynamically determining link characteristics for a first communication protocol connection traversing a virtual communication link. The virtual link forming a pathway over a communication network supporting a second protocol. The method comprising: requesting a first set of link characteristics from a first node connected at a first boundary location along the network to a second node connected at a second boundary location along the network; sending a route setup message from at least one of the nodes along the pathway; receiving from each of the nodes a fixed bandwidth and delay in a response setup message for forming the first set of link characteristics; repeating the steps of requesting, sending and receiving at a plurality of predetermined times to obtain a new set of link characteristics at each of the predetermined times. In some embodiments the first protocol is a HPR protocol, and the second protocol is an IP protocol.

Another aspect of the present invention provides a communication apparatus comprising: a first communication engine having a first communication engine I/O, a second communication engine I/O, and a third communication engine I/O, the first communication engine I/O in order to accept a first protocol link and support a first protocol; an encapsulator having a first encapsulator I/O and a second encapsulator I/O, the first encapsulator I/O coupled to the second communication engine I/O; a network engine supporting a second protocol and having a first network engine I/O, a second network engine I/O, and a third network engine I/O; and an estimator having a first estimator I/O and a second estimator I/O, the first estimator I/O coupled to the second network engine I/O, and the second estimator I/O coupled to the second communication engine I/O. The first network engine I/O is coupled to the second encapsulator I/O, the third network engine I/O to accept a coupling to a network supporting the second protocol. The encapsulator converts data between the first and second protocols, and the estimator measures link characteristics of the communication apparatus with respect to a remote apparatus coupled to the network. The network provides a remote virtual link with the apparatus. The virtual link is supported by the second protocol. In some embodiments the estimator measures the link characteristics at predetermined events. In some cases the predetermined intervals are fixed times increments ranging from a few milliseconds to many minutes. In specific embodiments, the first protocol engine is an HPR protocol engine and the second protocol engine is an IP protocol engine.

Another aspect of the present invention provides a method for dynamically estimating the characteristics of a virtual HPR link. The method comprising of: sending a plurality of back-to-back packets from a first HPR/IP node to a second HPR/IP node; measuring packet separation data between the back-to-back packets when received at the second HPR/IP node; determining a set of link characteristics of the IP network from the packet separation data at the second node; and returning the link characteristics to the first HPR/IP node. In some embodiments the step of estimating is done repeatedly at a predetermined interval, and/or is comprised of sending a plurality of probe packets to a receiver at an end of the virtual link, and receiving a plurality of response packets from the receiver from which the set of link characteristics are determined. Sometimes the probe packets include the time of send data, and/or the response packets contain a delay characteristics of the virtual link, and/or the response packets contain bandwidth characteristics of the virtual link.

Still another aspect of the present invention is to provide a method for dynamically estimating the characteristics of a virtual HPR link. The method comprising: monitoring a plurality of requests and a plurality of acknowledgments flowing between a first HPR/IP node and a second HPR/IP node on a virtual IP link; correlating each acknowledgment with one request; determining a delay between the each acknowledgement and the one request; determining a connection rate at which a first congestion control algorithm would transmit packets on a connection with the requests and the acknowledgments to the requests; and converting the connection rate into a corresponding link bandwidth and delay which would enable HPR to transmit at the same rate as the first congestion control algorithm. In some specific embodiments the first congestion control algorithm is a TCP congestion control algorithm, and the second congestion control algorithm is an ARB congestion control algorithm. In some cases the estimator comprises: a monitor, which observes the requests and acknowledgements/responses flowing through the apparatus; a correlator, which matches the requests to the acknowledgments/responses; a delay estimator, which determines the delay on a virtual HPR link on which the requests and acknowledgements/responses are flowing; a TCP connection rate generator, which determines a TCP rate at which a TCP connection sends data using a TCP congestion control algorithm; an ARB connection rate generator, which determines an ARB rate at which the TCP connection would send data using an ARB congestion control algorithm; a link rate generator, which sets a link rate equal to the TCP rate if the TCP rate is higher than the ARB rate, otherwise sets the link rate to the ARB rate. In some embodiments the estimator comprises: a monitor, which observes the requests and acknowledgements/responses flowing through the apparatus; a correlator, which matches the requests to the acknowledgments/responses; a delay estimator, which determines the delay on a virtual HPR link on which the requests and acknowledgements/responses are flowing; a first connection rate generator, which determines a first rate at which a connection sends data using a first congestion control algorithm; a second connection rate generator, which determines a second rate at which the connection would send data using a second congestion control algorithm; a link rate generator, which sets a link rate equal to the first rate if the first rate is higher than the second rate, otherwise sets the link rate to the second rate.

In still another aspect of the present invention, a gateway system is provided which comprises: a first apparatus having a first apparatus primary I/O and a first apparatus secondary I/O, and a second apparatus having a second apparatus primary I/O and a second apparatus secondary I/O. The first apparatus primary I/O to accept a first link connection supporting a first protocol, and the first apparatus secondary I/O to accept a connection to a communications network supporting a second protocol. The second apparatus primary I/O to accept a second link connection supporting a third protocol, and the second apparatus secondary I/O to accept a connection to the communications network. The second apparatus is coupled to the first apparatus via a virtual link within the communications network, with the virtual link supporting the second protocol. The first apparatus comprises a first estimator to measure a set of first link characteristics of the virtual link with respect to the second apparatus, and wherein. The second apparatus comprises a second estimator to measure a set of second link characteristics of the virtual link with respect to the first apparatus. In some case, the first estimator measures the first link characteristics at predetermined intervals. In some cases the second estimator measures the second link characteristics at the predetermined intervals, and/or the first and third protocols are HPR protocols and the second protocol is an IP protocol. In some embodiments the first estimator and the second estimator cooperate in measuring the first set of characteristic links and the second set of characteristic links, and/or the first apparatus further comprises a first encapsulator to convert between the first and second protocols, and the second apparatus further comprises a second encapsulator to convert between the first and third protocols.

In still another aspect, the present invention provides a program storage device readable by machine, tangibly embodying a program of instructions executable by the machine to perform method steps for dynamically estimating the characteristics of a virtual HPR link. The method steps comprising: monitoring a plurality of requests and a plurality of acknowledgments flowing between a first HPR/IP node and a second HPR/IP node on a virtual IP link; correlating each acknowledgment with one request; determining a delay between the each acknowledgement and the one request; determining a connection rate at which a first congestion control algorithm would transmit packets on a connection with the requests and the acknowledgments to the requests; converting the connection rate into a corresponding link bandwidth and delay which would enable HPR to transmit at the same rate as the first congestion control algorithm.

In still another aspect, the present invention provides an article of manufacture comprising: a computer usable medium having computer readable program code embodied therein to cause the dynamic estimatation of link characteristics of a virtual HPR link. The computer readable program code in the article of manufacture comprising computer readable program code to cause a computer to effect: the monitoring of a plurality of requests and a plurality of acknowledgments flowing between a first HPR/IP node and a second HPR/IP node on a virtual IP link; the correlating of each acknowledgment with one request; the determining of a delay between the each acknowledgement and the one request; the determining of a connection rate at which a first congestion control algorithm would transmit packets on a connection with the requests and the acknowledgments to the requests; and the converting of the connection rate into a corresponding link bandwidth and delay which would enable HPR to transmit at the same rate as the first congestion control algorithm.

DESCRIPTION OF FIGURES

These and other objects, features, and advantages of the present invention will become apparent upon further consideration of the following detailed description of the invention when read in conjunction with the drawing figures, in which.

DETAILED DESCRIPTION OF THE INVENTION

Figure 1:
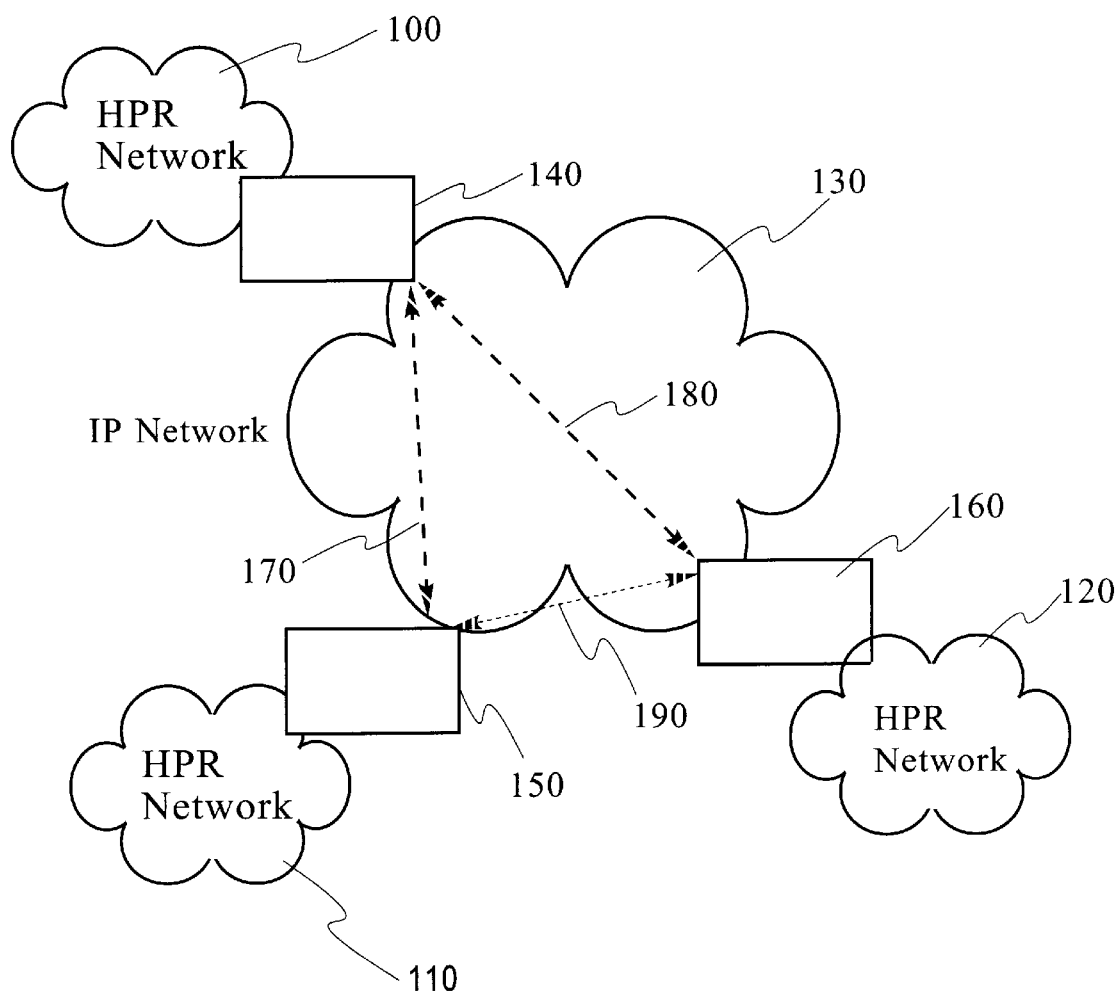
FIG. 1 shows several clusters of HPR networks connected together by an IP backbone network which is accessed via HPR-IP gateways.

An environment in which the invention can be used is shown in FIG. 1. It shows three HPR networks, 100, 110 and 120, which are interconnected together by a backbone IP network 130. The IP backbone 130 is connected to the HPR network 100 by means of an HPR-IP gateway 140. Similarly, HPR network 110 is connected by means of an HPR-IP gateway 150, and HPR network 120 is connected to the backbone by means of an HPR-IP gateway 160.

The task of the HPR-IP gateways is to provide the mechanisms so that the HPR networks 100, 110 and 120 can inter-operate. The gateways perform this task by creating logical links across the IP backbone network that provide the interconnection between the different HPR networks. These logical links are created by establishing a communication channel across the IP network using the UDP protocol. The creation of logical links is used widely within the networking community. FIG. 1 shows three logical links, 170, 180 and 190 which connect the three HPR networks together. In general, a virtual link may include several IP nodes and/or links.

Figure 2A:
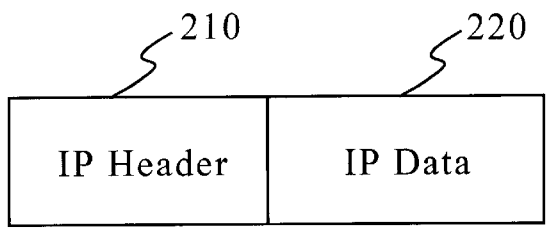
FIG. 2(a) shows the structure of any IP packet on an IP network.
Figure 2B:
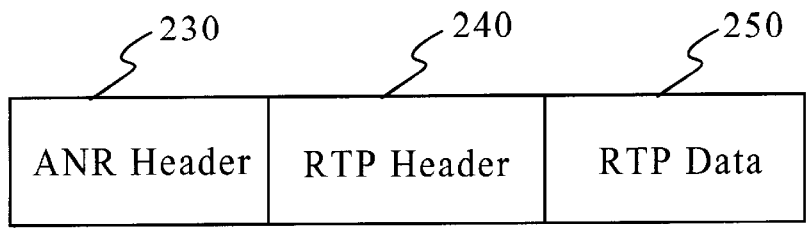
FIG. 2(b) shows the structure of a packet on a pure HPR network.
Figure 2C:
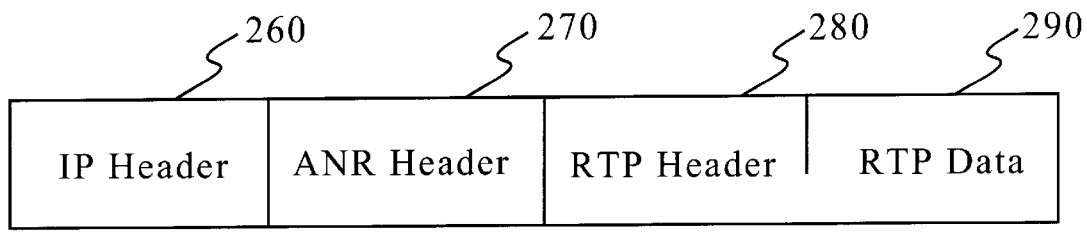
FIG. 2(c) shows the structure of a HPR packet when it is carried on the IP network.

FIGS. 2(a), 2(b) and 2(c) show the structure of packets as they are carried over different parts of the network. A packet on the IP backbone consists of two parts, an IP header 210 and an IP data 220, as shown in FIG. 2(a). A packet on an HPR network, e.g. in network 110 of FIG. 1, has the general format shown in FIG. 2(b). It consists of an ANR header 230 followed by an RTP header 240. These two headers are followed by the payload of RTP, or RTP data 250. When the packet shown in FIG. 2(b) is encapsulated over the virtual link, it is transported in the format shown in FIG. 2(c), which consists of an IP header 260 followed by the ANR header 270 and the RTP header 280, and the RTP data 290. At the point of origin of a virtual link, the ANR header 270 is derived from the ANR header 230, the RTP header 280 is derived from the ANR header 250, and the RTP data 290 is derived from the RTP data 250. At the destination point of the virtual link, the IP header 260 is removed, and the original packet in the format of FIG. 2(b) is regenerated, with the ANR header 230 derived from ANR header 270, RTP header 240 derived from RTP header 280, and RTP data 250 derived from RTP data 290.

The performance of a logical link created for interconnecting different HPR networks is very variable and unpredictable. This causes performance problems for RTP, which is the transport protocol used with HPR networks. RTP is used for point-to-point communication between a pair of applications on two computers connected together by an HPR network. RTP bases its reaction to congestion control on the notion of the bottleneck link, that it the slowest link between a pair of communicating links. It also assumes that the links are going to be used exclusively by RTP sources.

Because of competition from competing traffic from the network, the characteristics of the virtual link over the IP backbone varies dynamically over time. Sometimes, it may be the slowest link along the path, while at other times it may not be. Furthermore, when it is the slowest link on the path, the bandwidth available for HPR traffic varies dynamically due to the presence of competing non-HPR traffic.

In order for RTP to operate efficiently in this environment, the source needs to obtain the information about the dynamic characteristic of the link and use that in its congestion control algorithm. However, this information needs to be provided in a manner that is transparent to RTP so that the same RTP engine can be used for HPR links that are encapsulated over IP as well as native HPR links. In this invention we propose that this adaptation be provided by the HPR-IP gateway.

Figure 3:
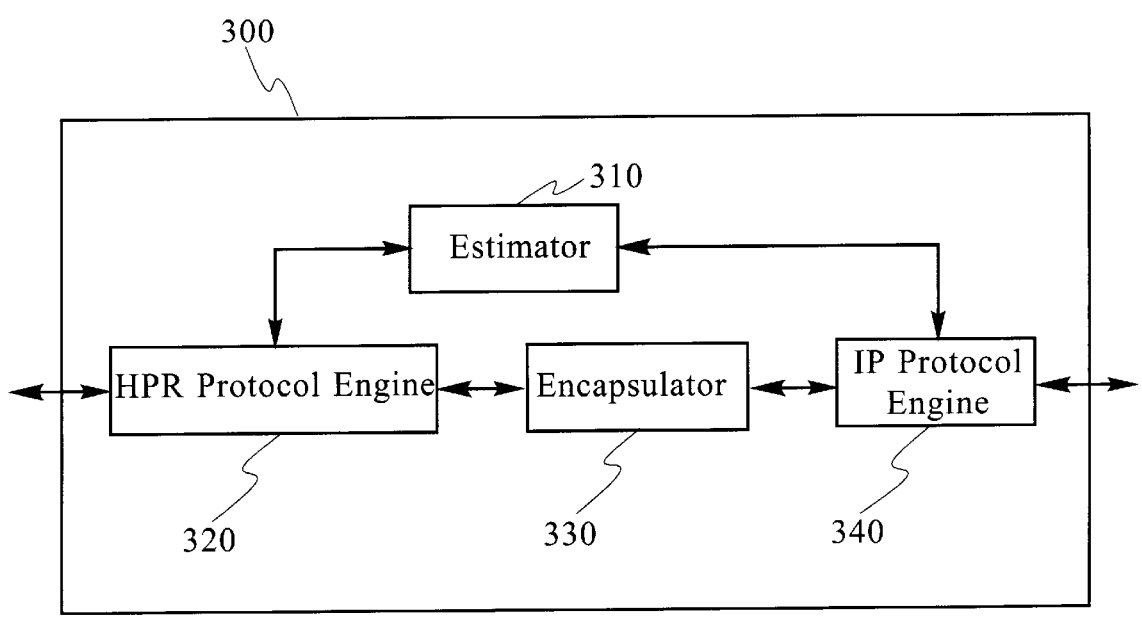
FIG. 3 shows the structure of an HPR-IP gateway illustrating the components that make up the HPR-IP gateway.

FIG. 3 shows a structure of an HPR-IP gateway that uses information about the current characteristics of the virtual link to improve the performance of HPR encapsulation over IP. The HPR-IP gateway 300 consists of four components. The HPR engine 320 is responsible for receiving and transmitting HPR packets in the format shown in FIG. 2(b), and for interacting with other components of the HPR network that send packets to it. The IP engine 340 is responsible for receiving and transmitting packets in the IP backbone network in the format shown in FIG. 2(a). The encapsulator 330 is responsible for converting packets from the HPR format to the IP format and vice-versa. The estimator 310 is a module that monitors the performance of the IP network, and computes its current link characteristics. The estimator determines the current link characteristics by monitoring the IP packets received and transmitted by the IP engine 340, and the RTP engine 320. It also communicates with the RTP engine to indicate the current characteristics of the virtual link. The encapsulator 330 can add information during the encapsulation and decapsulation phase, which would enable the estimator 310 to obtain better estimates of the link performance. One example of such information would be the time at which a packet is received for encapsulation. The estimator 310 at the other end looks at this information in order to determine the performance of the network. The encapsulators in the network can also exchange special probe packets in order to determine the network performance. These special probe packets carry time-stamps and sequence number information which permits the encapsulator at the other end to determine network performance.

The information about the current link characteristics need to be conveyed back to the RTP engine at the communicating node. As per the HPR architecture, the source RTP initiates a connection by sending out a route-establishment message which determines the characteristics of the path between the pair of communicating nodes. The current characteristics of the virtual path are always provided by the HPR engine in the HPR-IP engine gateway. Thus, each RTP connection that is initiated obtains the characteristics of the virtual links at the start of the connections.

For RTP connections that are relatively small, the dynamic determination of link characteristics at the time of connection establishment is adequate for the duration of the connection. For long-lived connections, the link characteristics vary over the life of the connection. The RTP engine at the source node can account for it by sending route-establishment queries at periodic intervals. However, this would require a change to the existing HPR architecture. Alternatively, the same RTP end-point is likely to have several RTP connection establishments over a period of time. The virtual link would be shared among all the different RTP connections established by the node. The RTP end-point would use the most current link characteristics in order to drive its congestion control scheme. The most current link characteristics would be obtained by the most current response to a route establishment message that involves the virtual link. Links characteristics obtained as a result of different route establishment messages can be correlated easily because they have a common ANR path from the source. The most current link characteristics can also be broadcast on the HPR network by the estimator in HPR-IP gateway on a periodic basis, or when the characteristics change by a significant amount. The broadcasts contain an identifier for the link whose characteristics are contained in the broadcast.

Figure 4:
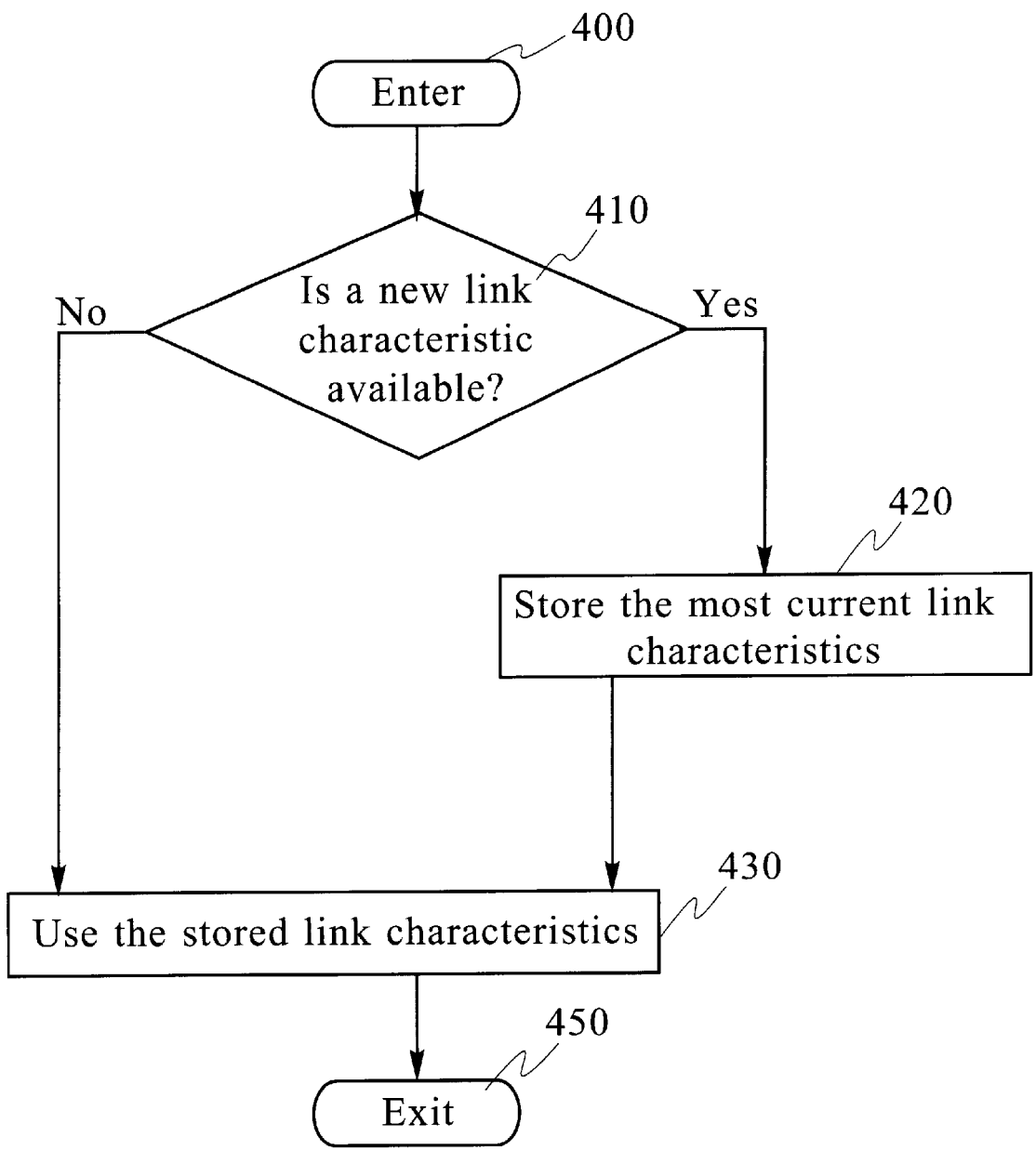
FIG. 4 shows a flow-chart used by the RTP source engine to determine the characteristics of a link along its path during its congestion control scheme.

FIG. 4 shows a flow-chart used by an RTP source engine to determine the characteristics of a link along its path during its congestion control scheme. The procedure is entered in step 400 whenever the characteristics of a link have to be determined. In step 410, the algorithm verifies whether a new link characteristic is available for the link in question. The new link characteristic may be available as a result of either a new route establishment message using the same link, or as a result of a new link status update broadcast by the HPR-IP gateway. If a new link characteristic is available, it is stored locally 420. In step 430 of the algorithm, the stored link characteristics are extracted. The stored data are always the most recently updated data. Finally, the algorithm exits in step 450.

In accordance with the present invention, the link characteristics of the virtual link may themselves be identified by using a variety of techniques. Three such techniques that can be used for determining the link characteristics of an IP virtual link are described herein. Other techniques may be similarly employed to implement the present invention.

Method 1, consists of using pre-existing link characteristic tools. These tools (e.g. a tool known as pathchar on the Internet) send out special IP control messages that become invalid after a fixed number of hops. On the expiration of the invalid messages, the corresponding router sends a reply back to the originating host. This scheme identifies the characteristics of all the IP links along the path. The individual path characteristics are aggregated together by adding up their delays and taking the minimum available bandwidth on the links. This information is then provided to the HPR engine. Other tools available for this purpose are bprobe and cprobe, developed at Boston University. These tools are invoked at periodic intervals, as well as when an abrupt change in network conditions is observed. The abrupt change in network conditions include a sudden loss of packets in the network, or a failure of a link or a node in the network.

Figure 5:
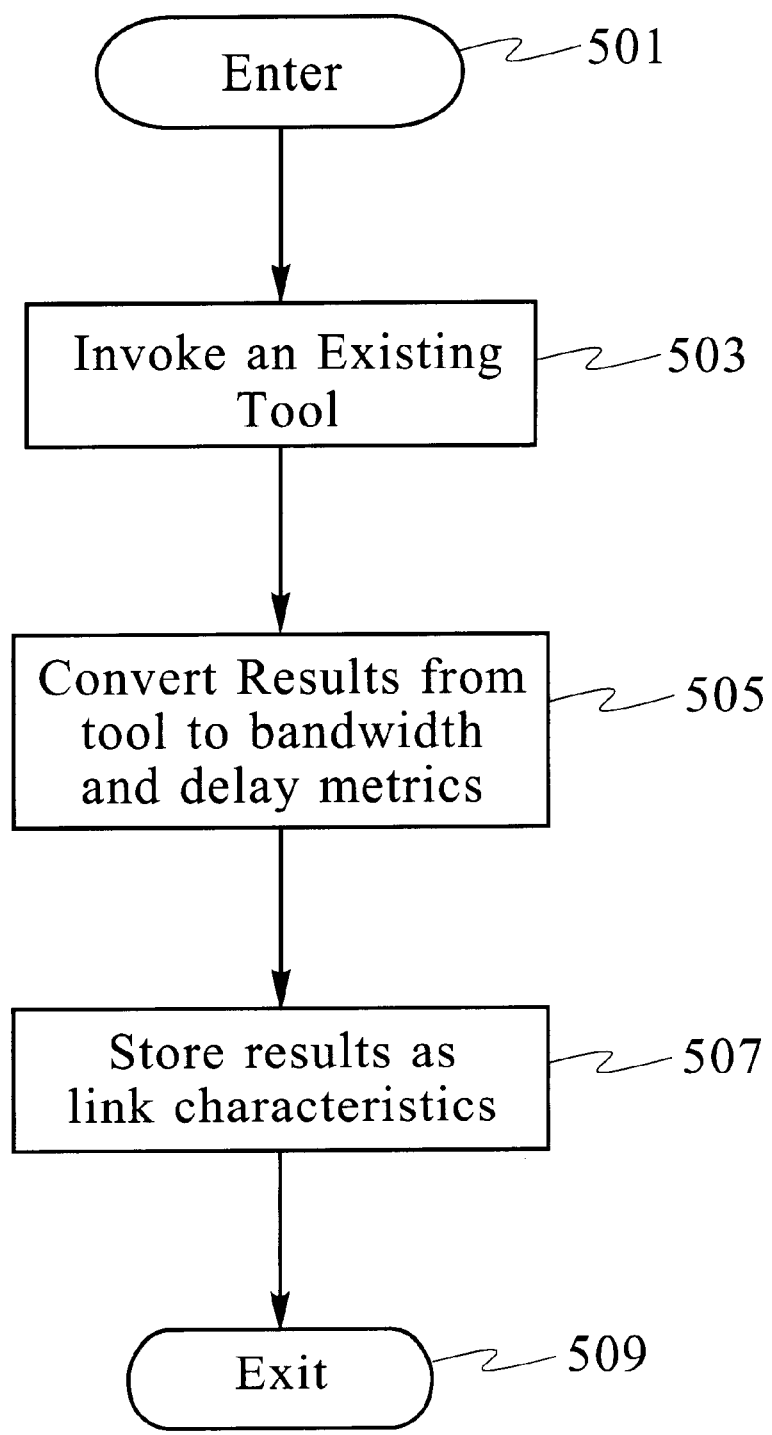
FIG. 5 shows a flow-chart used by the estimator component of the HPR/IP gateway to estimate the dynamic characteristics of a virtual link along its path using pre-existing link characteristic tools.

FIG. 5. shows a flow-chart used by an estimator component of a HPR/IP gateway to obtain the dynamic characteristics of a virtual link along its path using Method 1. The procedure is initiated at predetermined times. The procedure is entered in step 501. In step 503, an existing tool, such as traceroute or bprobe, is invoked to obtain the characteristics of the virtual link. In step 505, the results obtained from the existing tool are converted to the link characteristics understood by the HPR algorithm. Specifically, the link delay and bandwidth metrics are obtained from the output of the existing tools. After that, in step 507, these link characteristics are stored in a location that is accessible by the RTP source engine executing the flow-chart described in FIG. 4 and the procedure is exited 509.

Method 2 consists of sending a group of probe packets on the network. These probe packets are sent out by an estimator in an originating HPR-IP gateway to the estimator in another HPR-IP gateway. The sending estimator puts the current time-stamp and sequence number in the origin packet. This information is analyzed by the recipient estimator who can analyze this information locally, or can store its current time-stamp into the packet and reflect it back to the original HPR/IP gateway. The analysis of the information determines the delay and bandwidth of the virtual link by, for example, observing the sequence numbers and the time-stamp placed by the originating HPR-IP gateway.

Figure 6:
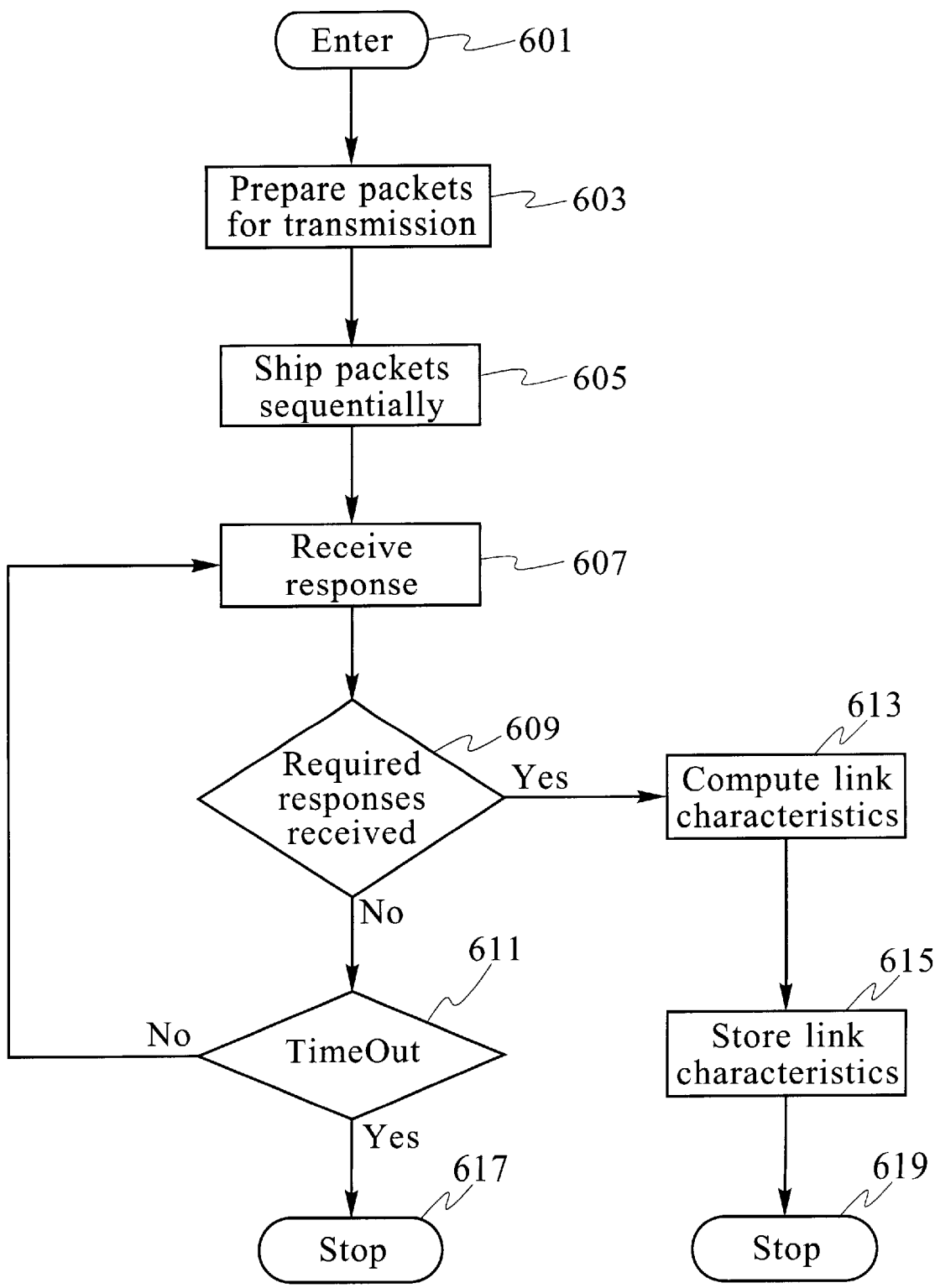
FIG. 6 show the flow-chart used by the estimator component of the HPR/IP gateway to request the estimation of the dynamic characteristics of a virtual link along its path by sending a group of probe packets in the network.
Figure 7:
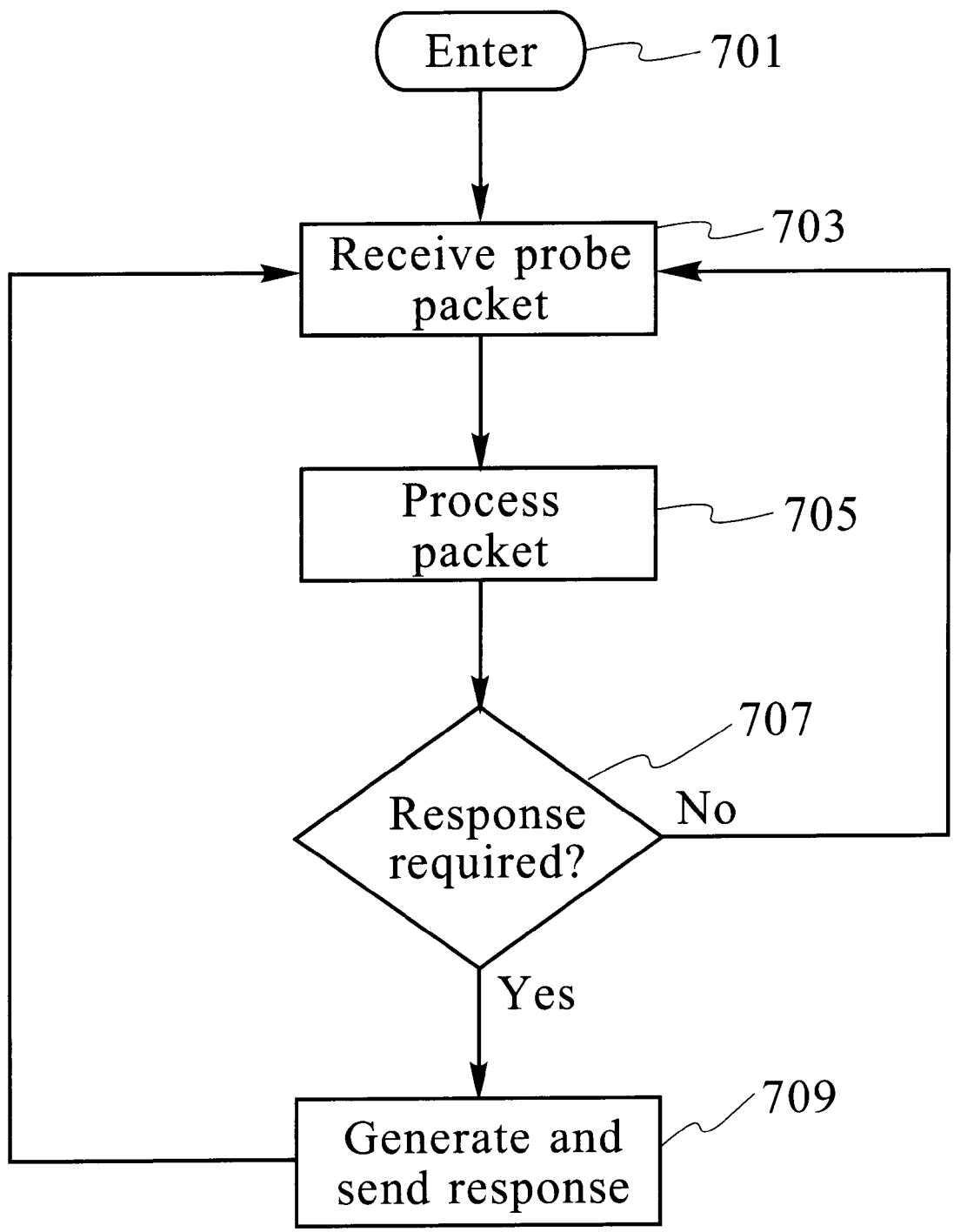
FIG. 7 show the flow-chart used by the estimator component of the HPR/IP gateway to respond to the estimation of the dynamic characteristics of a virtual link along its path using the method of sending a group of probe packets in the network.

FIGS. 6 and 7 show the flow-charts used by an estimator component of the HPR/IP gateway to obtain the dynamic characteristics of a virtual link along its path using Method 2. Method 2, requires two estimators, one on each of the two ends of a virtual link enabling the HPR/IP gateways to communicate with each other. One of these estimators initiates the estimating procedure using the flow-chart illustrated in FIG. 6. The other estimator responds to the estimation requests using the flow-chart illustrated in FIG. 7.

The procedure illustrated in FIG. 6 is generally entered at pre-determined times 601. In step 603, two or more packets are prepared for transmission to the estimator on a second HPR/IP gateway. In this preparation step, the current time and packet sequence number is put into the packet. After the packets have been prepared, they are shipped out on the IP gateway sequentially 605. Subsequently, in step 607, the procedure waits for the responses/acknowledgments to the packets to be received, and stores them in local memory. In step 609, the procedure checks if it has obtained the required number of responses to determine the link characteristics. If the required responses have been received, it computes the link characteristics on the basis of those responses in step 613. In step 615, these responses are stored so that they can be used by an RTP source engine procedure such as that illustrated in FIG. 4. The process then stops in step 619. If the result of step 609 is negative, and all required responses have not been received, the procedure checks if a specified time-out period after the requests have been sent has elapsed 611. If the time-out period has elapsed, and the response have not been received, the estimation procedure stops 617. However, if the time-out period has not elapsed, the procedure continues to wait for more responses.

The procedure illustrated in FIG. 7 is entered by an estimator during its initialization in step 701. In step 703, the estimator waits for probes from its partner estimator on the other end of the virtual link. When the probe packet is received, the packets are processed in step 705. Depending on the probing method selected by the two estimators, the processing in step 705 can either simply reflect the probe packets back to the sender, or it can compute the link characteristics at its local end. On each probe packet, the procedure checks if a response packet needs to be generated. This check is performed in step 707. If no response is needed, the procedure goes back to receiving more packets in step 703. If the response is needed, a response packet is generated and sent back in step 709, after which the estimator procedure reverts back to receiving the next probe packet in step 703.

Method 3 consists of snooping into the higher level protocol headers at the HPR-IP gateway. The HPR-IP gateway traditionally looks only at the IP and ANR headers of packets shown in FIG. 2. RTP header contains various congestion control information data that can be used to determine the rate at which packets should be sent in the network. The RTP protocol uses a particular algorithm to translate this congestion control information into a transmission rate for a connection. Other congestion control protocols, such as TCP use somewhat different algorithms to translate the congestion control information into the transmission rate. The HPR-IP gateway analyzes the congestion control information and uses both the TCP and RTP congestion control algorithms to determine the transmission rate. If the transmission rate for TCP turns out to be higher, the HPR-IP gateway computes the effective bandwidth and delay of the virtual link for which the RTP congestion control scheme would send packets at the same transmission rate as the TCP algorithm. These link characteristics are then published by the HPR-IP gateway as those of the virtual link.

Figure 8:
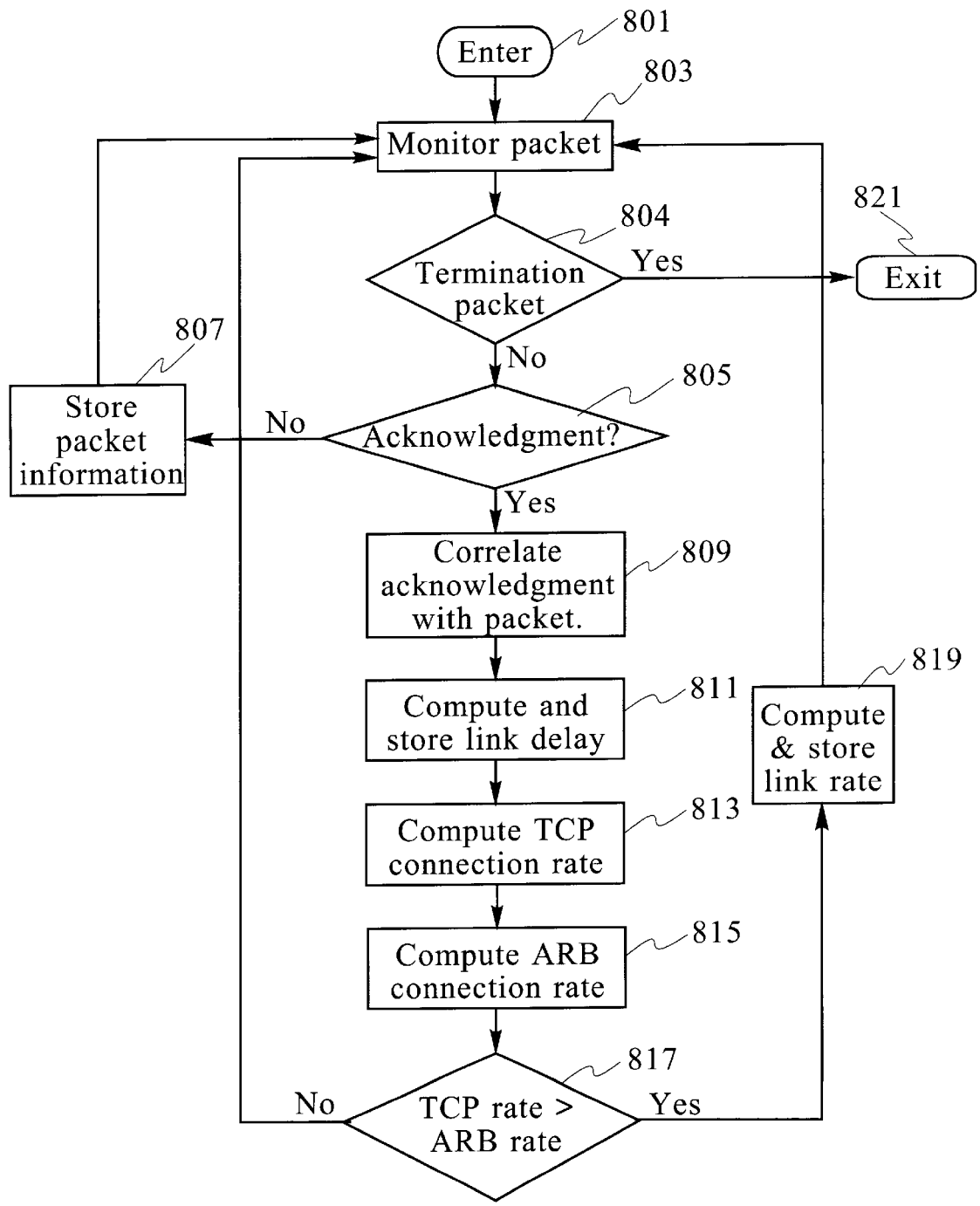
FIG. 8 shows the flow-chart used by the estimator component of the HPR/IP gateway to estimate the dynamic characteristics of a virtual link along its path using a third method.

FIG. 8 shows the flow-chart used by the estimator component of the HPR/IP gateway to obtain the dynamic characteristics of a virtual link along its path using Method 3. The procedure is entered at step 801 when an HPR/IP connection is established through the HPR/IP gateway. At this step, a default set of link characteristics are assumed for the virtual link. In step 803, the packets flowing through the HPR/IP gateway are monitored and classified into packet transmissions, acknowledgments of packet transmission, requests for network rate information, and replies (acknowledgment) of network rate information. In step 804, the procedure checks if the packet signals the end of the HPR/IP connection. If so, the procedure exits in step 821. Otherwise, In step 805, the procedure checks if the packet is an acknowledgment (or rate reply packet). Information from the rate requests and packet transmissions which is needed for computing link characteristics is stored for further processing in step 807. When an acknowledgment packet, or reply to a rate request is obtained, in step 809, the procedure finds its corresponding rate request or original packet. In step 811, the time when the packet was originally transmitted and when the reply (or acknowledgment) are received are compared, and the delay on the virtual HPR link is estimated from the difference in the two times. In step 813, the information about the packets and the acknowledgment patterns they received are analyzed to determine the rate that a TCP congestion control algorithm would obtain when used for the specified HPR/IP connection. This rate is obtained by executing the procedures of the TCP congestion control algorithm, which is well known in prior art. In step 815, the ARB congestion control algorithm is executed and the rate it would assign to the connection under the same set of constraints is computed. The ARB protocol engine is well known in prior art. One distinguishing feature about the TCP congestion control algorithm is that it computes its connection rate without using the characteristics of the virtual link, whereas ARB protocol uses the link characteristics as an input in computing its connection rate. In step 817, the TCP connection rate and the ARB connection rate are compared. If the ARB connection rate is higher than the TCP connection rate, the link characteristics are left unchanged, and the procedure reverts to step 803. If the TCP connection rate is higher than the ARB connection rate, then in step 819 the procedure computes the virtual link rate which would cause ARB to operate at the same connection rate as TCP. One method of doing it is to divide the TCP connection rate by an configuration parameter of ARB which specifies the ratio of ARB initial connection rate to the link rate. This information is stored and the procedure moves back to step 803.

Generally, a request is information that is generated by one of end of a connection and sent to the other end. An acknowledgment is an indication from the other end that it received the request. After the second end has processed the request, it may also send a reply back to the first end. The TCP congestion control algorithm determines a rate at which to send new requests by analyzing the acknowledgments received for requests sent earlier. The ARB congestion control algorithm determines a rate at which to send new requests by analyzing the replies generated to a subset of requests sent earlier. Both of these, the TCP acknowledgments and the ARB replies, are herein commonly referred to as acknowledgments/responses.

Figure 9:
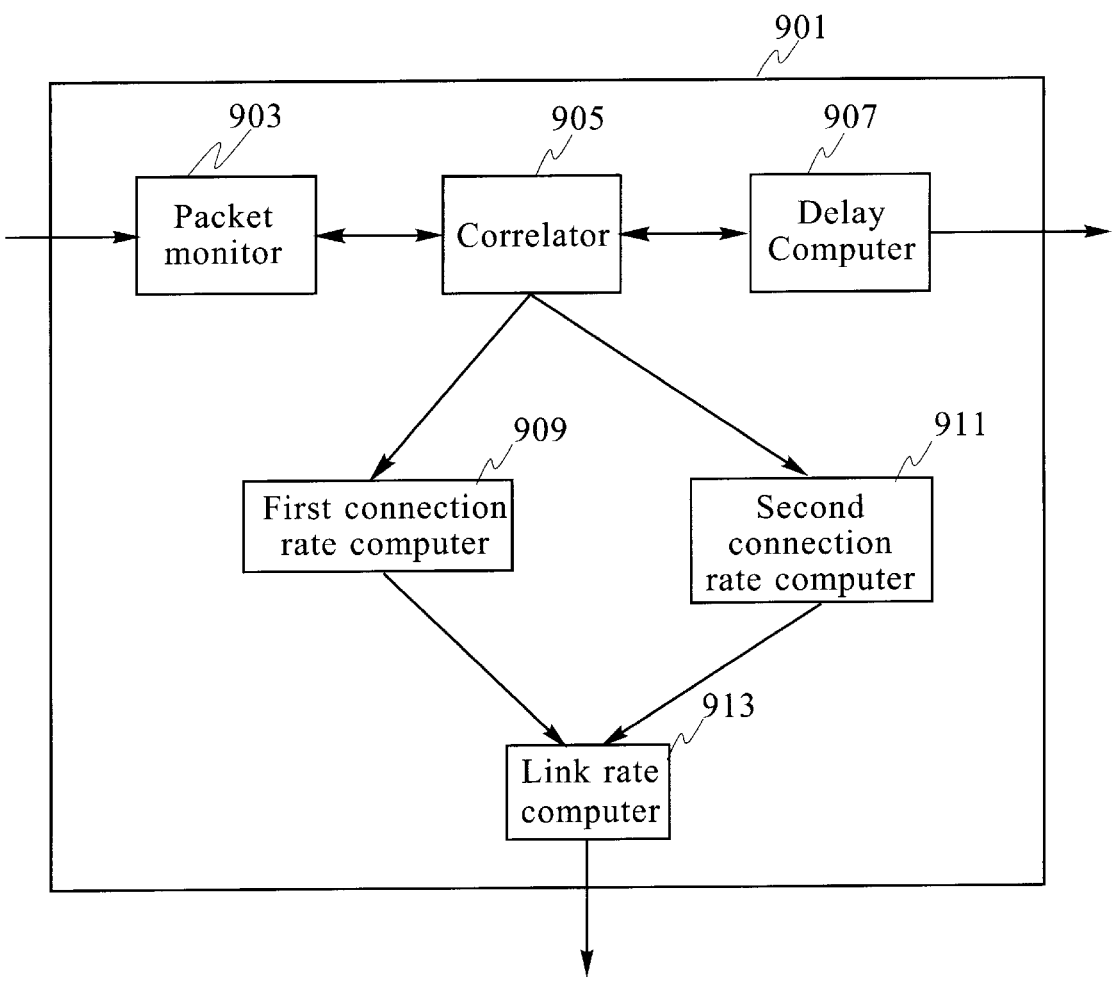
FIG. 9 shows the structure of an estimator component of the HPR/IP gateway which estimates the dynamic characteristics of a virtual link along its path using a method of snooping into the higher level protocol headers at the HPR-IP gateway.

FIG. 9 shows a flow structure of the estimator that can be used to determine the dynamic characteristics of a virtual HPR link. The estimator 901 consists of packet monitor 903, a correlator 905, a delay computer 907, a first connection rate computer 909, a second connection rate computer 911 and a link rate computer 913. The packet monitor 903 receives information about packets flowing through the HPR/IP gateway on a monitor input port, and classifies the packets into requests, acknowledgments, replies and packet transmissions. The packet monitor 903 passes the classification information to a correlator 905 via a correlator output port. The correlator 905 receives this information, and sends information about acknowledgments and corresponding packets (or matching request-reply pairs) to the delay computer 907 via the delay output interface. The delay computer 907 receives this information via its correlator input interface and determines the delay of a virtual HPR link from this information. The delay computer 907 outputs the link delay on a link delay output port. The correlator 905 sends the packet information to a first rate computer 909 and a second rate computer 911. The first connection rate computer determines the connection rate for a HPR/IP session using the TCP congestion control algorithm, while the second connection rate computer determines the connection rate for a HPR/IP session using the ARB congestion control algorithm. The two connection rates thus computed are sent to a link rate computer 913. The link rate computer compares the two connection rates, and chooses the higher of the two rates. If the TCP rate is not the highest, then the link rate computer determines the minimum link rate at which the second connection rate computer 911 would have obtained the same rate as the first connection rate computer 909. The computed link rate is sent on a link rate output port.

All the embodiments of the present inventions are also suitable for inclusion in an article of manufacture and/or a program storage device readable by machine, with the article/device being used for implementing the present invention in a particular system. For example, the article may be a floppy or hard disc, a CDROM or any media and/or equipment capable of being loaded with data or a program for enabling a system or computer to perform an embodiment of the invention. For example this may be any of the HPR gateways 100 shown in FIG. 1. This includes embodiments wherein the data and/or programs are available locations that are remote from the network and/or elements that employ this invention. This encompasses cases in which the data and/or programs are downloaded from one location/medium for use at another location or another medium.

It is noted that these schemes are only example of the different methods and apparatus that can be used. One versed in the art can replace them with other schemes for predicting the characteristics of the virtual link. It is further noted that although the description is made for particular arrangements and steps, the intent and concept of the present invention are suitable and applicable to other arrangements and combination of steps. It will be clear to those skilled in the art that other modifications to the disclosed embodiments can be effected without departing from the spirit and scope of the invention.

What is claimed is:

1. A method for dynamically estimating the characteristics of a virtual High Performance Routing (HPR) link, said method comprising:
   sending a plurality of back-to-back packets from a first High Performance Routing over the Internet Protocol (HPR/IP) node to a second HPR/IP node;
   measuring packet separation data between the back-to-back packets when received at the second HPR/IP node;
   determining a set of link characteristics of the Internet Protocol (IP) network from the packet separation data at the second node; and
   returning the link characteristics to the first HPR/IP node.

2. A method as in claim 1, wherein the step of estimating is done repeatedly at a predetermined interval.

3. A method as in claim 1, wherein the step of estimating is comprised of sending a plurality of probe packets to a receiver at an end of said virtual link, and receiving a plurality of response packets from the receiver from which the set of link characteristics are determined.

4. A method as in claim 3, wherein the probe packets include the time of send data.

5. A method as in claim 3, wherein the response packets contain a delay characteristics of the virtual link.

6. A method as in claim 3, wherein the response packets contain bandwidth characteristics of the virtual link.

7. A method for dynamically estimating the characteristics of a virtual High Performance Routing (HPR) link, said method comprising:
   monitoring a plurality of requests and a plurality of acknowledgments flowing between a first High Performance Routing over the Internet Protocol (HPR/IP) node and a second HPR/IP node on a virtual Internet Protocol (IP) link;
   correlating each acknowledgment with one request;
   determining a delay between said each acknowledgment and said one request;
   determining a connection rate at which a first congestion control algorithm would transmit packets on a connection with the requests and the acknowledgments to the requests; and
   converting the connection rate into a corresponding link bandwidth and delay which would enable HPR to transmit at the same rate as the first congestion control algorithm.

8. A method as described in claim 7, wherein the first congestion control algorithm is a Transmission Control Protocol (TCP) congestion control algorithm, and the second congestion control algorithm is an Adaptive Rate-Based (ARB) congestion control algorithm.

9. A communication apparatus comprising:
   a first communication engine having a first communication engine I/O, a second communication engine I/O, and a third communication engine I/O, said first communication engine I/O to accept a first protocol link and support a first protocol;
   an encapsulator having a first encapsulator I/O and a second encapsulator I/O, said first encapsulator I/O coupled to said second communication engine I/O;
   a network engine supporting a second protocol and having a first network engine I/O, a second network engine I/O, and a third engine I/O, a second network engine I/O, and a third network engine I/O, said first network engine I/O coupled to said second encapsulator I/O, said third network engine I/O to accept a coupling to a network supporting said second protocol; and
   an estimator having a first estimator I/O and a second estimator I/O, said first estimator I/O coupled to said second network engine I/O, and said second estimator I/O coupled to said second communication engine I/O,
   wherein said encapsulator converts data between said first and second protocols, and said estimator measures link characteristics of said communication apparatus with respect to a remote apparatus coupled to said network, said network providing a remote virtual link with said gateway apparatus, said virtual link supported by said second protocol, and
   wherein the estimator comprises:
   a monitor, which observes the requests and acknowledgments/responses flowing through the apparatus;
   a correlator, which matches the requests to the acknowledgments/responses;
   a delay estimator, which determines the delay on a virtual HPR link on which the requests and acknowledgments/responses are flowing;
   a TCP connection rate generator, which determines a TCP rate at which a TCP connection sends data using a TCP congestion control algorithm;
   an ARB Connection Rate Generator, which determines an ARB rate at which the TCP connection would send data using an ARB congestion control algorithm;
   a link rate generator, which sets a link rate equal to the TCP rate if the TCP rate is higher than the ARB rate, otherwise sets the link rate to the ARB rate.

10. A communication apparatus comprising:
   a first communication engine having a first communication engine I/O, a second communication engine I/O, and a third communication engine I/O, said first communication engine I/O to accept a first protocol link and support a first protocol;
   an encapsulator having a first encapsulator I/O and a second encapsulator I/O, said first encapsulator I/O coupled to said second communication engine I/O;
   a network engine supporting a second protocol and having a first network engine I/O, a second network engine I/O, and a third network engine I/O, said-first network engine I/O coupled to said second encapsulator I/O, said third network engine I/O to accept a coupling to a network supporting said second protocol; and
   an estimator having a first estimator I/O and a second estimator I/O, said first estimator I/O coupled to said second network engine I/O, and said second estimator I/O coupled to said second communication engine I/O,
   wherein said encapsulator converts data between said first and second protocols, and said estimator measures link characteristics of said communication apparatus with respect to a remote apparatus coupled to said network, said network providing a remote virtual link with said gateway apparatus, said virtual link supported by said second protocol, and
   wherein the estimator comprises:
   a monitor, which observes the requests and acknowledgments/responses flowing through the apparatus;

a correlator, which matches the requests to the acknowledgments/responses;

a delay estimator, which determines the delay on a virtual HPR link on which the requests and acknowledgments/responses are flowing;

a first connection rate generator, which determines a first rate at which a connection sends data using a first congestion control algorithm;

a second connection rate generator, which determines a second rate at which the connection would send data using a second congestion control algorithm;

a link rate generator, which sets a link rate equal to the first rate if the first rate is higher than the second rate, otherwise sets the link rate to the second rate.

11. A program storage device readable by machine, tangibly embodying a program of instructions executable by the machine to perform method steps for dynamically estimating the characteristics of a virtual High Performance Routing (HPR) link, said method steps comprising:

monitoring a plurality of requests and a plurality of acknowledgments flowing between a first High Performance Routing over the Internet Protocol (HPR/IP) node and a second HPR/IP node on a virtual Internet Protocol (IP) link;

correlating each acknowledgment with one request;

determining a delay between said each acknowledgment and said one request;

determining a connection rate at which a first congestion control algorithm would transmit packets on a connection with the requests and the acknowledgments to the requests;

converting the connection rate into a corresponding link bandwidth and delay which would enable HPR to transmit at the same rate as the first congestion control algorithm.

12. An article of manufacture comprising:

a computer usable medium having computer readable program code embodied therein to cause the dynamic estimation of link characteristics of a virtual High Performance Routing (HPR) link, the computer readable program code in said article of manufacture comprising computer readable program code to cause a computer to effect:

the monitoring of a plurality of requests and a plurality of acknowledgments flowing between a first High Performance Routing over the Internet Protocol (HPR/IP) node and a second HPR/IP node on a virtual Internet Protocol (IP) link;

the correlating of each acknowledgment with one request;

the determining of a delay between said each acknowledgment and said one request;

the determining of a connection rate at which a first congestion control algorithm would transmit packets on a connection with the requests and the acknowledgments to the requests; and the converting of the connection rate into a corresponding link bandwidth and delay which would enable HPR to transmit at the same rate as the first congestion control algorithm.

* * * * *